United States Patent [19]

Smith

[11] 3,910,116

[45] Oct. 7, 1975

[54] TRANSDUCER POSITIONING MEANS FOR FLUID LEVEL MONITORING

[75] Inventor: Robert T. Smith, Williamsville, N.Y.

[73] Assignee: Rexnord Inc., West Milwaukee, Wis.

[22] Filed: Dec. 7, 1973

[21] Appl. No.: 422,916

[52] U.S. Cl. ............................. 73/290 V; 73/290 V
[51] Int. Cl.² ......................................... G01F 23/28
[58] Field of Search ............. 73/290 R, 290 V, 67.7, 73/67.8 S; 340/1 L

[56] References Cited
UNITED STATES PATENTS

| | | | |
|---|---|---|---|
| 2,943,296 | 6/1960 | Fryklund | 73/290 V X |
| 3,636,756 | 1/1972 | White | 73/67.8 S X |
| 3,791,201 | 2/1974 | Dory | 73/67.8 S |

OTHER PUBLICATIONS

Rod, R. L., *Ultrasonic Liquid Level*, In Electronics, pp. 156–161, April 1954.

*Primary Examiner*—Richard C. Queisser
*Assistant Examiner*—Joseph W. Roskos
*Attorney, Agent, or Firm*—Christel & Bean

[57] ABSTRACT

Positioning means for positioning the transmitting and receiving transducer means of a fluid level monitoring system above the fluid, such as in monitoring the liquid level in a conduit. The positioning means comprises an elongated frame, a reflecting surface at one end of the frame, and a housing at the opposite end of the frame into which the transducer is fitted. The frame is positioned in the space containing the fluid with the longitudinal axis thereof generally parallel to the surface of the fluid. Mechanical wave energy signals from the transducer travel in a direction parallel to the axis of the frame toward the reflecting surface which directs the signals toward the fluid level in a direction perpendicular thereto. Signals reflected from the fluid level incident upon the reflecting surface of the positioning means are directed to the transducer. The distance between the transducer and the reflecting surface is made at least equal to the electrical dead band characteristic of the transducer.

10 Claims, 6 Drawing Figures

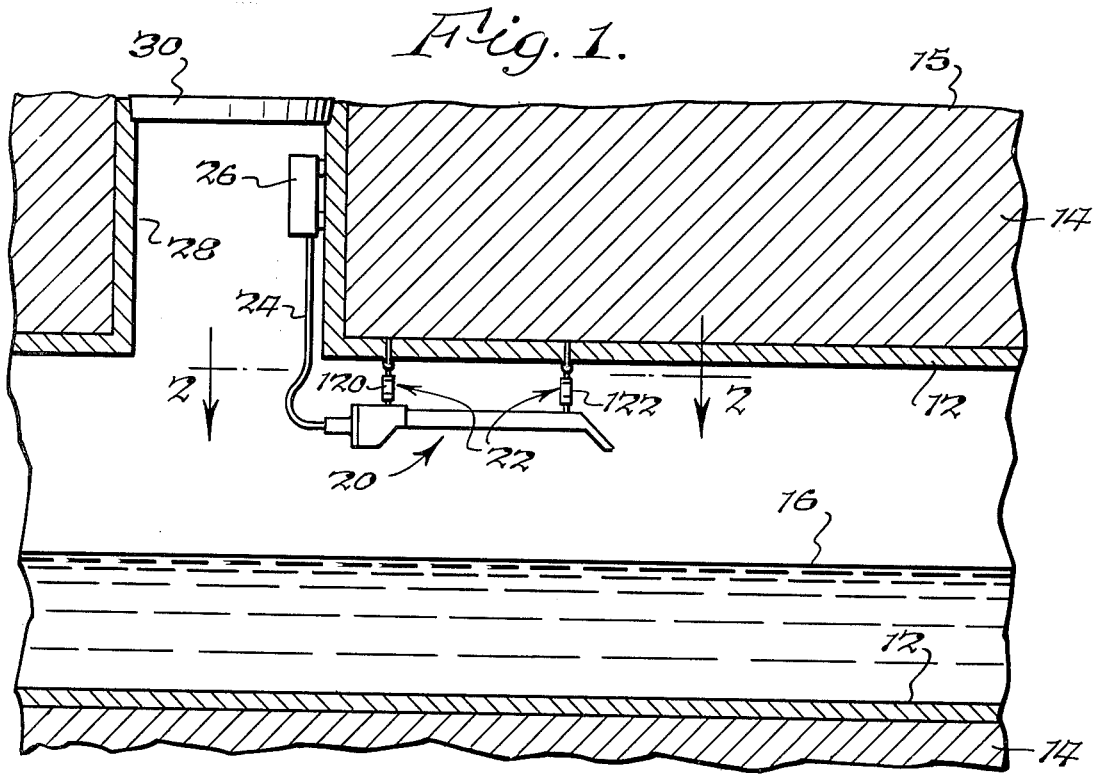
Fig. 1.
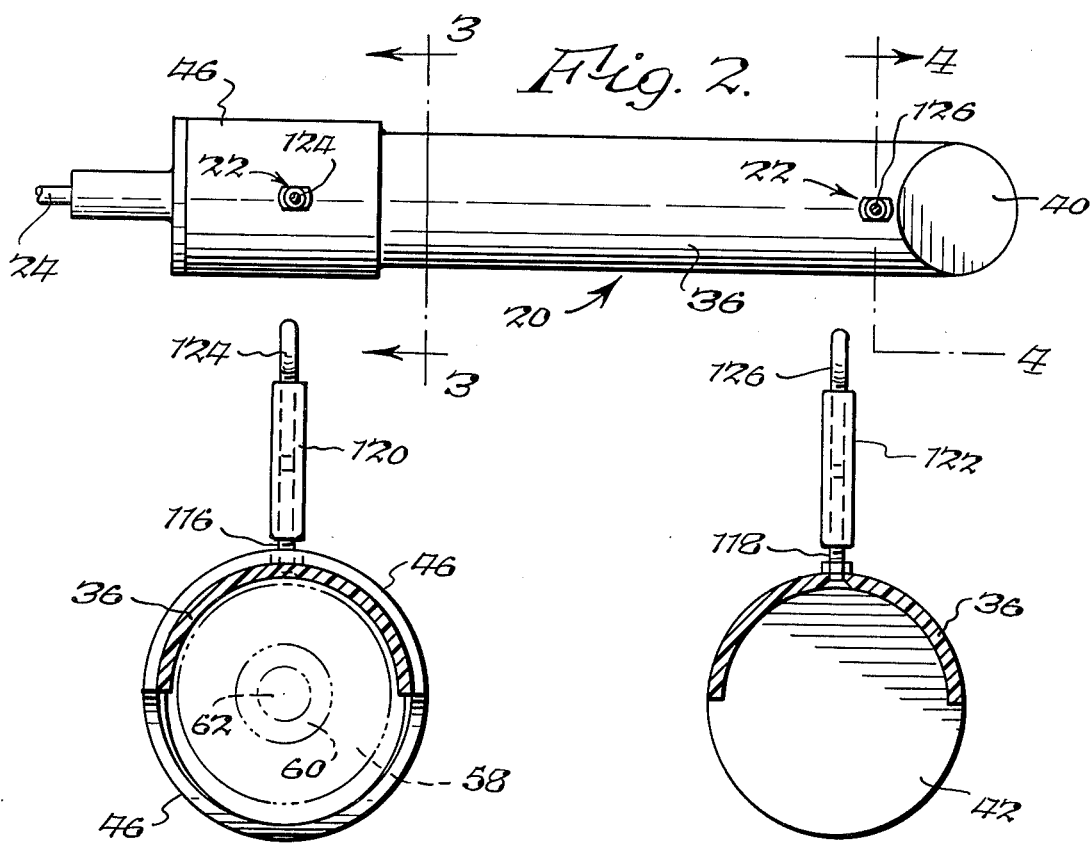
Fig. 2.
Fig. 3.
Fig. 4.

TRANSDUCER POSITIONING MEANS FOR FLUID LEVEL MONITORING

BACKGROUND OF THE INVENTION

This invention relates to measurement of the level of a fluid in a given space, and more particularly to a new and improved apparatus for positioning the transducer of a measuring system relative to the fluid being monitored.

One area of use of the present invention is in monitoring the level of a fluid in a confined space, such as liquid in a conduit, although the principles of the invention can be variously applied to monitoring fluid levels in other spaces or regions. In monitoring systems which are not exposed to or otherwise contacted by the fluid, a transducer is employed to transmit mechanical wave energy through space toward the fluid and to receive signals reflected therefrom. A change in a parameter of the signals provides a quantitative indication of the change in fluid level.

Such transducers are of value in permitting a non-contact type of fluid or liquid level monitoring. A problem arises, however, because typically the transducer is suspended perpendicular to the level of the fluid or liquid being monitored. In a confined space, such as a sewer, this can be highly inconvenient and sometimes impossible. The problem is complicated by the fact that such a transducer has an electrical dead band, of for example 18 inches from the transducer face, the transducer being essentially inoperative to measure a surface located close enough to the transducer face to be within the dead band.

SUMMARY OF THE INVENTION

It is, therefore, an object of this invention to provide a new and improved apparatus for positioning the transducer of a measuring system relative to the level of a fluid being monitored in a given space.

It is a further object of this invention to provide such apparatus for positioning the transducer in a confined space, such as a conduit, in a manner such that the measuring system can operate even when the perpendicular distance between the fluid or liquid and the transducer is less than the electrical deadband characteristic of the transducer.

It is a further object of this invention to provide such positioning apparatus which is relatively simple in construction and yet reliable and effective in operation.

The present invention provides positioning means for positioning the transmitting and receiving transducer means of a fluid level monitoring system above the fluid. The positioning means positions the transducer means in a manner such that signals transmitted by the transducer travel in a first direction and are caused to travel in a second direction perpendicular to and toward the surface of the fluid or liquid being monitored. Signals reflected from the surface are caused by the positioning means to travel in a direction toward the transducer. In preferred form, the positioning means comprises an elongated frame disposed with the longitudinal axis thereof generally parallel to the surface of the fluid or liquid, means defining a reflecting surface at one end of the frame, and means for holding the transmitting and receiving transducer means at the other end of the frame.

The foregoing and additional advantages and characterizing features of the present invention will become apparent upon a reading of the ensuing detailed description together with the included drawing wherein:

BRIEF DESCRIPTION OF THE DRAWING FIGURES

FIG. 1 is a fragmentary sectional view of a conduit containing a liquid and showing in elevation the positioning means of the present invention for use with apparatus for monitoring the liquid level;

FIG. 2 is an enlarged top plan view of the positioning means of the present invention;

FIG. 3 is an enlarged sectional view taken about on line 3—3 in FIG. 2;

FIG. 4 is an enlarged sectional view taken about on line 4—4 in FIG. 2;

DETAILED DESCRIPTION OF THE ILLUSTRATED EMBODIMENT

Figure 5:
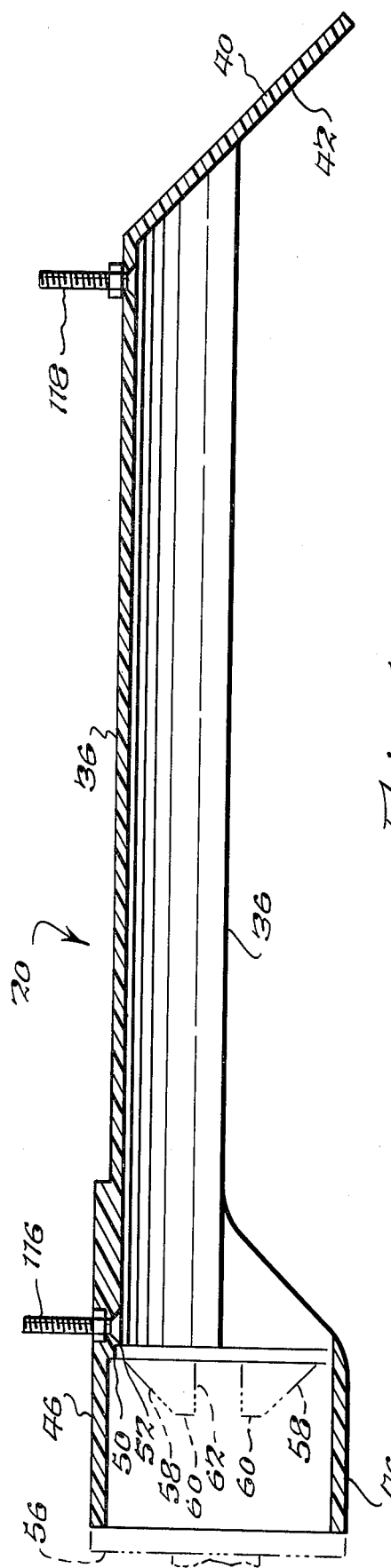
FIG. 5 is an enlarged longitudinal sectional view of the positioning means of the present invention.

FIG. 1 shows an illustrative installation of the apparatus of the present invention for use in a system for measuring the level of a fluid in an enclosure. In the present instance the enclosure is a horizontally disposed conduit 12, for example a sewer pipe, located in the earth 14 below ground level 15 and containing a fluid 16 such as waste liquid. From time to time the level or height of the liquid or water 16 within sewer pipe 12 will change or vary, and it is desirable to provide a system for measuring that liquid level. These measuring systems comprise a transmitting transducer means which produces energy pulses, such as ultrasonic waves or vibrations, and causes the pulses to travel to the surface of the fluid such as the liquid 16 in FIG. 1, and the systems also include a receiving transducer means for detecting pulses reflected from the surface of the liquid. These systems further include suitable apparatus operatively connected to the receiving transducer means for providing a quantitative indication of the liquid level which indication can be visible or in other useable forms.

The apparatus of the present invention comprises positioning means generally designated 20 on FIG. 1, for positioning the transmitting and receiving transducer means of such measuring systems in the space above the fluid such as water 16. In the present illustration the positioning means 20 is connected by fastening means generally designated 22 to the upper portion of the inner surface of conduit 12. A preferred form of fastening means will be described in detail presently. The transmitting and receiving transducer means is carried by the positioning means 20 in a manner which will be described, and the transducer means is electrically connected by means of a cable 24 to indicating apparatus including appropriate electrical circuitry contained within a housing 26 located adjacent the upper end of a vertical access conduit 28 extending upwardly from an opening in the top of conduit 12. Conduit 28, of the type commonly found with sewer pipes and located at appropriate intervals along the pipe 12, defines an opening or manhole adjacent the ground level 15 which is closed by a cover 20 in a known manner. The indicating apparatus including housing 26 can of course be positioned at any desired location and the apparatus can be part of a telemetering system of the wire or wireless type whereby information as to the level of fluid 16 is utilized at a remote location.

Referring now to FIGS. 2–5, the positioning means 20 according to the present invention comprises an elongated frame 36 having a longitudinal axis. In preferred form frame 36 is semi-cylindrical in cross section and relatively uniform in thickness along the length thereof. Frame 36 preferably is machined or formed from a cylinder or sleeve of synthetic plastic material, and by way of example frame 36 can be formed from a section of polyvinyl chloride pipe having an outer diameter of about 3⅝ inches and a wall thickness of about 3/16 inches, the section being cut in half longitudinally along the center or longitudinal axis thereof. Frame 36 may be machined or formed from any other suitable material, such as steel, stainless steel, nylon, deldrin, etc., that may be compatible with the fluid or atmosphere above the level being monitored.

The apparatus of the present invention further comprises means defining a reflecting surface at one end of frame 36. The surface is disposed so that energy pulses travelling in a direction from the opposite end of frame 36 are directed by the reflecting surface toward the surface of the fluid, such as liquid 16 in the arrangement of FIG. 1, and the surface is disposed so that pulses travelling upwardly from the surface of the fluid are directed by the reflecting surface toward the opposite end of frame 36. As shown in FIG. 5, one end of frame 36, i.e., the right-hand end as viewed in FIG. 5, terminates in an edge which lies in a plane disposed at an angle to the longitudinal axis of frame 36. The angle, described in a clockwise direction proceeding from the longitudinal axis of frame 36 to the edge, is acute. A reflector or deflector element 40 is fixed on this edge so as to define a reflecting surface 42 disposed toward the opposite end of frame 36. Element 40 preferably is of the same material and thickness of frame element 36 and can be circular or slightly elliptical in configuration. Element 40 would be suitably bonded or secured to the end face of frame 36 such as by cement, and alternatively a unitary or integral component comprising frame 36 and element 40 of course could be molded or machined. Reflecting surface 42 preferably is disposed at an angle of 45° with respect to the longitudinal axis of frame 36, the angle being measured in a clockwise direction from the axis, for a reason which will be described in detail presently.

The apparatus of the present invention further comprises means for mounting the transmitting and receiving transducer means of a measuring system at the opposite end of frame 36 in a manner so as to direct transmitter pulses toward reflecting surface 42 and to receive pulses reflected from surface 42. A cylindrical housing 46 is provided at the left-hand end of frame 36 as viewed in FIG. 5 such as by fitting a cylinder or sleeve onto the end of the frame 36 and cementing the two elements together. Alternatively, the entire positioning means 20 comprising frame 36, deflector 40 and housing 46 can be molded or machined from suitable material to provide a unitary or integral component. As shown in FIG. 5, the outer diameter of housing 46 thus will be greater than the outer diameter of the half cylinder surface of frame 36, the two surfaces meeting at a right angle edge. The inner surface of housing 46 has a diameter sized to receive a housing of the transmitting and receiving transducer means, and the inner surface at the end opposite the open left-hand end as viewed in FIG. 5 terminates in a right angle edge 50 which serves as a stop or shoulder for positioning the transducer assembly as it is fitted into the housing 46. A second end surface 52, spaced inwardly from edge 50 and disposed in a plane parallel thereto, is the end surface of the frame portion 36, the spacing between these two surfaces serving to provide a region which facilitates drainage of liquid from this part of the assembly.

The frame 36 and housing 46 are designed to support and position various types of transmitting and receiving transducer means, and the following specific arrangement is described for purposes of illustration. The component which is fitted into the housing 46 is generally cylindrical and is provided at one end with a cap or closure 56 as shown in the broken line portion of FIG. 5. The opposite end of the component has an annular conical surface 58 which terminates in an annular, radially disposed surface 60, which, in turn, meets a cylindrical and axially extending housing portion 62. Surface 60 is of flexible material and disposed perpendicular to the longitudinal axis of the cylindrical component within housing 46. Surface 58 preferably is disposed at an angle of 45° with respect to that longitudinal axis and can be plastic, steel or similar materials. The transducer element is positioned within housing portion 62 and comprises, in preferred form, a piezoelectric element having the shape of an annulus or ring which is fabricated in a known manner to vibrate in a radial mode. Thus, when the piezoelectric element is excited, ultrasonic vibrations emanate radially outwardly from the cylindrical housing portion 62 and strike the reflecting surface 58 whereupon they are directed in a horizontal direction as viewed in FIG. 5 toward reflecting surface 42. In other words, the ultrasonic waves reflected from the annular surfaces 58 travel in a direction generally parallel to the transducer axis and generally parallel to the longitudinal axis of the frame 36. In a similar manner, incoming ultrasonic radiation incident on surface 58 is reflected toward the housing portion 62 whereupon it vibrates or agitates the piezoelectric element therein resulting in a corresponding electrical output signal from the piezoelectric element in a known manner.

Figure 6:
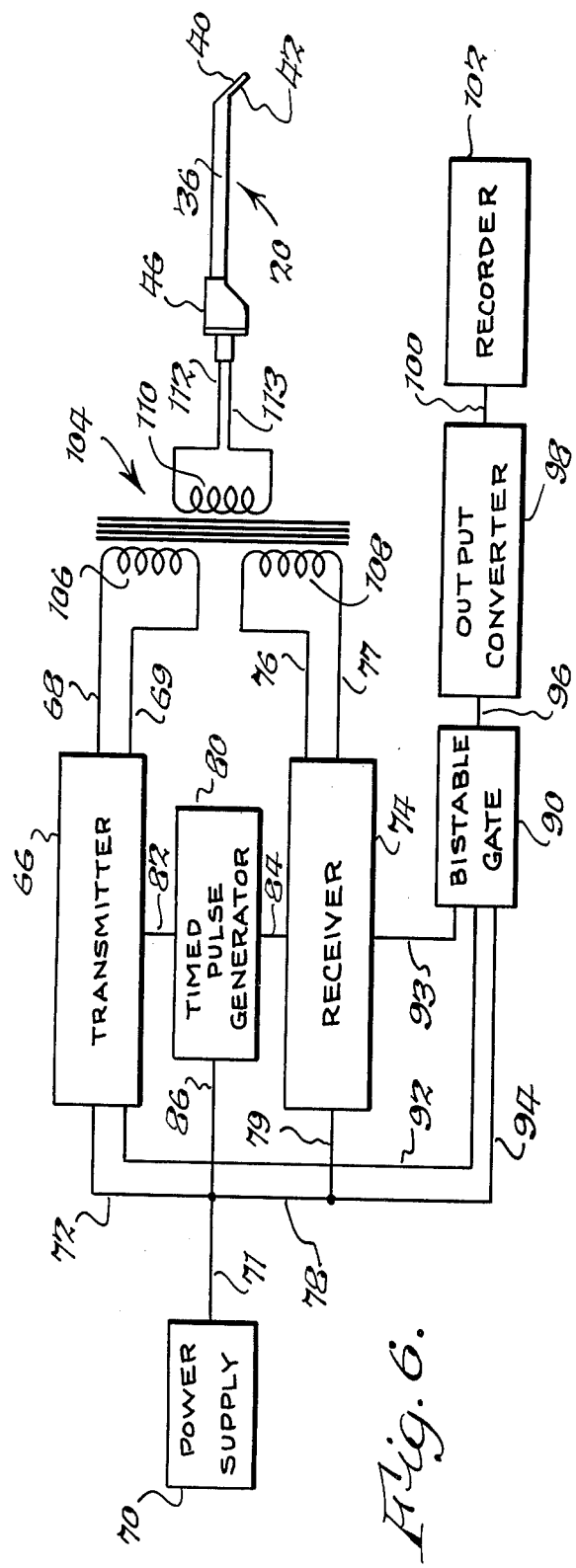
FIG. 6 is a schematic diagram of a typical fluid level monitoring system with which the positioning means of the present invention is used.

FIG. 6 shows an illustrative measuring system which can be used with the positioning means of the present invention. The system includes a transmitter means generally designated 66 in FIG. 5 which functions to generate output pulses which are available between lines 68, 69 connected to the output of transmitter 66. Electrical power for operating transmitter 66 as well as the other electrical components in the system is obtained from a standard power supply 70 providing electrical power output on a line 71. A line 72 connects the power supply output from line 71 to transmitter 66.

The system of FIG. 6 further comprises a receiver means which serves to detect receiver electrical pulses or signals corresponding to energy pulses reflected back from the fluid and which signals are applied to the input of receiver 74 through line 76, 77 connected to the input of receiver 74. Electrical power for operating receiver 74 is obtained from power supply 70, and line 71 from the power supply is connected to receiver 74 through lines 78, 79. The operation of transmitter means 66 and receiver means 74 is controlled and timed by a timing means in the formed of a timed pulse generator generally designated 80 in FIG. 6. Timed pulse generator 80 is operatively connected to transmitter 66 by means of a line 82 and is operatively connected to receiver 74 by means of a line 84. Electrical power for operating generator 80 is obtained from power supply 70 by a line 86 connecting line 71 to generator 80.

The measuring system of FIG. 6 further comprises means connected to transmitter 66 and receiver 74 for determining the elapsed time or time difference between an output pulse from transmitter 66 and a reflected pulse signal received at receiver 74 and for converting the determined time difference into an electrical quantity which can be used for various purposes such as providing a visual indication or making a recording of this information. A bistable gate circuit generally designated 90 has a pair of inputs and an output, and a line 92 connects transmitter 66 to one input of gate 90 and a line 93 connects receiver 74 to the other input of gate 90. Electrical power for operating bistable gate 90 is provided by a line 94 connecting the junction of lines 78, 79 to gate 90. Gate 90 functions, briefly, to determine the time difference between transmitted and received pulses, and in the present illustrative example gate 90 converts the detected time difference into a voltage amplitude. This voltage amplitude is coupled from the output of gate 90 through a line 96 to the input of an output converter circuit, generally designated 98, which converts the voltage quantity into a current magnitude for use in the system. A line 100 connects the output of converter 98 to the input of a recorder means generally designated 102 which converts the current quantity into a useable form. For example, recorder 102 could comprise a chart and stylus type recorder for providing a permanent record of the change in fluid lever over time. It is to be understood that this portion of the system can have various forms for providing an indication of the instantaneous level of the fluid being monitored.

The measuring system of FIG. 6 is operatively connected to the transmitting and receiving transducer means within housing 46 of positioning means 20 in the following manner. The system includes a transformer generally designated 104 having a first primary winding 106 connected to leads 68 and 69 from the output of transmitter 66. The transformer 104 includes a second primary winding 108 connected to leads 76, 77 which go to the input of receiver 74. The secondary output winding of transformer 104 is connected by leads 112, 113 to the ring-shaped piezoelectric transducer within the housing portion 62. According to a preferred mode of the present invention, there would be included an impedance transformer (not shown) connected between leads 112, 113 and the piezoelectric transducer in a manner readily apparent to those skilled in the art.

The system of FIG. 6 operates in the following manner. An output pulse produced by transmitter 66 is coupled through the primary and secondary windings 106 and 110, respectively, of transformer 104 and then through leads 112, 113 to the piezoelectric transducer within housing 46. As previously explained, the transducer when energized produces output vibrations in the ultrasonic frequency range which are transmitted or propogated in a direction parallel to the axis of the transducer within housing 46 and parallel to the longitudinal axis of the frame 36 of positioning means 20. The vibrations or mechanical wave energy pulses are incident upon reflecting surface 42 and then directed by surface 42 toward the fluid or liquid interface. The significance of positioning means 20 including frame 36 and the reflecting surface 42, will be described in detail presently. The time between pulses produced by transmitter 66 is controlled by the timed pulse generator 80 and is determined by the known distance range between the transducer and the fluid level. For proper operation of the measuring system, it is necessary that a reflected pulse be detected by receiver 74 before the next pulse is sent out from transmitter 66 and this timing control is provided by generator 80. It is desired for efficient operation to provide as many pulses per second from transmitter 66 as the distance range will allow, in conjunction with the requirement that for each transmitted pulse the reflected or received pulse must reach receiver 74 before the next pulse is sent from transmitter 66. The timed pulse generator 80, therefore, is adjusted or set beforehand for the particular monitoring application, having in mind the approximate or estimated range of variation in the fluid level. By way of illustration, a typical system would provide output pulses from transmitter 66 at a frequency of about 45 kilohertz, the time between pulses being in the range from about 10 to about 50 milliseconds and the pulse duration being about 0.2–0.3 milliseconds.

Once a transmitted mechanical wave energy pulse is incident on the fluid interface it is reflected back to reflecting surface 42 whereupon it is reflected by surface 42 in a direction generally parallel to the longitudinal axis of frame 36 of the positioning means and to the piezoelectric transducer within housing 46 as previously explained. This, in turn, stresses or vibrates the transducer providing an electrical signal on leads 112, 113 which is coupled through secondary winding 110 of transformer 104 to primary winding 108 and through leads 76, 77 to the input of receiver 74. Timed pulse generator 80 functions to turn transmitter 66 and receiver 74 on at the same time.

Line 92 provides gate 90 with a signal at the instant of time a pulse is sent out from transmitter 66. Line 93 provides gate 90 with a signal at the incident of time a pulse is received by receiver 74. In other words, the occurrence of a pulse from transmitter 66 sets gage 90 and the reception of a reflected pulse at receiver 74 resets or turns off the gate 90. Gate 90 is a bistable type gate readily known to those skilled in the art so that a detailed description thereof is believed to be unnecessary. The gate circuitry can include a capacitance circuit at the output thereof so that the electrical quantity representative of the time duration corresponding to the elapsed time is integrated to a voltage amplitude output. This voltage amplitude, in turn, is converted by converter 98 to a current magnitude present on line 100 and containing information indicative of fluid level. As previously explained, this current can be utilized by appropriate indicating apparatus to provide a visual indication of instantaneous fluid or liquid level. Alternatively, this current can be applied to the input of recorder 102 as shown in FIG. 5 for providing a continuing, permanent record of the fluid or liquid level over time.

In the monitoring of the level of a fluid, for example the level of a liquid in a given space, the transmitted waves must travel in a direction perpendicular to the level of the liquid before they are incident thereon and so that they travel in the same direction upon return to provide an accurate measurement. In measuring systems heretofore available, the transducer typically was suspended perpendicular to the level of the fluid or liquid being monitored. In other words, it was necessary to position the transducer so that the face thereof from which the mechanical wave energy signals emanated was disposed toward the fluid surface so that the waves would travel perpendicular to the surface to provide an accurate measurement. In a confined space, such as in a conduit like the sewer pipe 12 shown in FIG. 1, this can be highly inconvenient and sometimes impossible. The problem is complicated by the fact that there is a dead band for the transducer face for some types, the transducer being essentially inoperative to measure a surface positioned close enough to the transducer face to be within the dead band. In particular, due to the time constant inherent in the electrical circuitry of such measuring systems, there is a certain minimum distance through which the pulses must travel in order to enable the system to differentiate between an initiated or transmitted pulse and a reflected pulse. In other words, a certain minimum time must elapse before the reflected pulse comes back, and this requirement is due to the time constant of the electrical circuitry. This minimum distance is known as the dead band, and it functions to overcome or compensate for this time constant. For convenience in illustration and explanation, a dead band of about 18 inches will be specified for the piezoelectric transducer described in the foregoing example. Therefore, in a conduit such as a sewer, for example, the typical transducer arrangement would have to be positioned with the transducer face at least 18 inches vertically above the surface level of the liquid being measured, and of course this distance of 18 inches would have to be measured from the estimated maximum level to which the liquid might be expected to rise.

In accordance with the present invention, the positioning means provides a mounting or positioning for the transducer such that the transmitted and reflected mechanical energy waves have a first path or direction which preferably is generally horizontal as viewed in FIG. 1 adjacent the transducer and a second path or direction which is perpendicular to the fluid surface being monitored at or adjacent to the surface. This path is vertical in the arrangement of FIG. 1. In particular, the positioning means of the present invention is mounted in the space containing the fluid to be measured and positions or mounts the transducer in a manner such that the transmitted and reflected waves have a horizontal path between the transducer mounted in housing 46 and the reflecting surface 42 and whereupon the reflected surface 42 causes the waves to travel between the surface 42 and the surface of liquid 16 being measured in a direction perpendicular to the surface of the liquid which direction is vertical in FIG. 1. Furthermore, the reflecting surface 42 is positioned and spaced by frame 36 a distance from the face of the transducer in housing 46 a distance equal to the dead band of the transducer, or spaced an even slightly larger distance to provide whatever tolerance may be needed. This distance is measured from about the center of reflecting surface 42 to the face of the transducer and along a line which is parallel to the transducer axis, which line also is perpendicular to the transducer face. Therefore, the dead band spacing according to the present invention is provided generally parallel to the surface of the fluid or liquid being measured so that the surface being monitored can rise to the level of the positioning means assembly and even above that level. In other words, the positioning means of the present invention permits the monitoring system to operate even when the perpendicular distance between the fluid level being monitored and the transducer is less than the electrical dead band characteristic of the transducer. So long as mechanical wave energy signals can travel between the transducer face and reflecting surface 42, and between surface 42 and the fluid level being monitored in a direction perpendicular to the fluid level, the monitoring system will continue to provide an indication. The positioning means 20, in particular the longitudinal axis of frame 36, is disposed generally parallel or can even be slightly somewhat inclined relative to the surface of the fluid being measured. Actually, the longitudinal axis of the positioning means and frame could be disposed at any angle relative to the surface being measured which is less than 90°, but preferably it will at an angle of about 0°, i.e., parallel to the fluid level being monitored. When the positioning means is inclined, the reflecting surface 42 will be disposed at an angle equal to onehalf the complementary angle of the longitudinal axis of frame 36 with respect to the surface of the fluid level being monitored. Preferably, the positioning means will be positioned horizontally over the liquid being measured.

The positioning means 20 is mounted in conduit 12 of the present illustration by fastening means 22 which in preferred form can include turnbuckles. In particular, bolts 116, 118 are secured through the upper surface of frame 36 at spaced locations therealong as shown in FIG. 5 in a manner such that the threaded portions are exposed above frame 36 and the bolts 116, 118 are disposed vertically and perpendicular to the surface of liquid 16. Bolts 116, 118 are located along a center line accurately positioning the positioning means 20 and transducer carried thereby in proper orientation relative to the surface below. A pair of turnbuckle sleeves 120 and 122 are threaded onto bolts 116 and 118, respectively, and a pair of threaded hooks 124 and 126 are threaded into the other ends of sleeves 120 and 122, respectively. Hooks 124, 126, in turn, are connected by wires or other hooks into the wall of conduit 12 at uppermost part thereof as viewed in FIG. 1. the foregoing description of fastening means 22 is by way of illustration, and other forms of fastening or connecting means can of course be employed.

The positioning means 20 of the present invention provides a transducer mounting which is parallel to the surface being monitored, with the deflecting surface 42 causing the beam to move perpendicularly between the deflector and the surface being monitored. Furthermore, the surface 42 is positioned a distance from the transducer face equal to the dead band of the transducer, or even slightly greater to provide whatever tolerance may be needed. Therefore, the dead band spacing which conventionally had been provided along a perpendicular distance between the transducer face and the surface being monitored, here is provided along a different path or direction, i.e., parallel to the surface being monitored. As a result, the fluid surface being monitored can rise to the level of the transducer housing 46 or even above that level. The foregoing is provided by a positioning means which is relatively simple in construction and reliable and effective in operation. Frame 36 is constructed to be of semi-cylindrical cross-section to avoid echo interference with the ultrasonic beam travelling between the transducer face and reflecting surface 42.

It is therefore apparent that the present invention accomplishes its intended objects. While a single embodiment of the present invention has been described in detail, this is for the purpose of illustration, not limitation.

I claim:

1. In a system for monitoring the level of a fluid in an enclosure wherein a transmitting and receiving transducer means produces energy pulses and detects pulses reflected from the surface of the fluid, means for positioning the transmitting and receiving transducer means above the fluid comprising:
   a. an elongated frame means having a longitudinal axis;
   b. means for mounting said frame means to said enclosure and above the fluid in a manner such that the longitudinal axis of said frame means is disposed generally parallel to the surface of of the fluid;
   c. means defining a reflecting surface at one end of said frame means, said reflecting surface being disposed such that energy pulses traveling in a direction from the opposite end of said frame means toward said reflecting surface are directed by said surface toward the surface of the fluid and pulses reflected from the surface of the fluid toward said reflecting surface are directed by said surface toward the opposite end of said frame means;
   d. means for holding said transmitting and receiving transducer means at the opposite end of said frame means so as to direct transmitted energy pulses toward said reflecting surface and to receive pulses reflected from said reflecting surface; and
   e. said reflecting surface being spaced from said transmitting and receiving transducer means by a distance at least equal to the electrical dead band characteristic of said transmitting and receiving transducer means.

2. Apparatus according to claim 1, wherein said reflecting surface is disposed at an angle of 45° with respect to the axis of the transducer.

3. Apparatus according to claim 1, wherein said means for holding said transducer means comprises a hollow housing adapted to receive said transducer means therein and provided with stop means therein for locating said transducer means axially therein.

4. Apparatus according to claim 3 further including means defining a drainage space in the region between said stop means in said housing and said frame means.

5. Apparatus according to claim 1, wherein said frame means is semi-cylindrical in cross section.

6. Apparatus according to claim 1, wherein said positioning means comprises an elongated frame, a hollow housing provided at one end of said frame and adapted to receive said transducer means in a manner positioning the face of said transducer means toward the other end of said frame, and a reflector member provided at said other end of said frame and disposed at an angle of about 45° with respect to the axis of said transducer means.

7. In a system for monitoring the level of a fluid in an enclosure wherein a transmitting and receiving transducer means produces energy pulses and detects pulses reflected from the surface of the fluid, means for positioning the transmitting and receiving transducer means above the fluid comprising:
   a. an elongated frame means having a longitudinal axis;
   b. means for positioning said frame means in said enclosure in a manner such that the longitudinal axis of said frame means is disposed at an angle less than 90° with respect to the surface of the fluid;
   c. means for holding said transmitting and receiving transducer means at one end of said frame means; and
   d. means defining a deflecting surface at the other end of said frame means, said deflecting surface being spaced from said transducer means at least equal to the electrical dead band characteristic of said transducer means;
   e. whereby energy pulses produced by said transducer means travel in a direction toward said deflecting surface and are deflected by said surface toward the surface of the fluid and pulses reflected from the surface of the fluid are deflected by said deflecting surface toward said transducer means.

8. Apparatus according to claim 7, wherein said deflecting surface is disposed at an angle equal to one-half the complementary angle of said longitudinal axis of said frame means with respect to the surface of the fluid.

9. Apparatus according to claim 7, wherein said elongated frame means is semi-cylindrical in cross-section.

10. Apparatus according to claim 7, wherein said positioning means comprises an elongated frame, a hollow housing provided at one end of said frame and adapted to receive said transducer means in a manner positioning the face of said transducer means toward the other end of said frame, and a deflector member provided at said other end of said frame and disposed at an angle equal to one-half the complementary angle of said longitudinal axis of said frame means with respect to the surface of the fluid.

* * * * *